Feb. 19, 1946.　　　J. G. INGRES　　　2,395,223
VEHICLE BRAKE MECHANISM
Filed Jan. 13, 1944
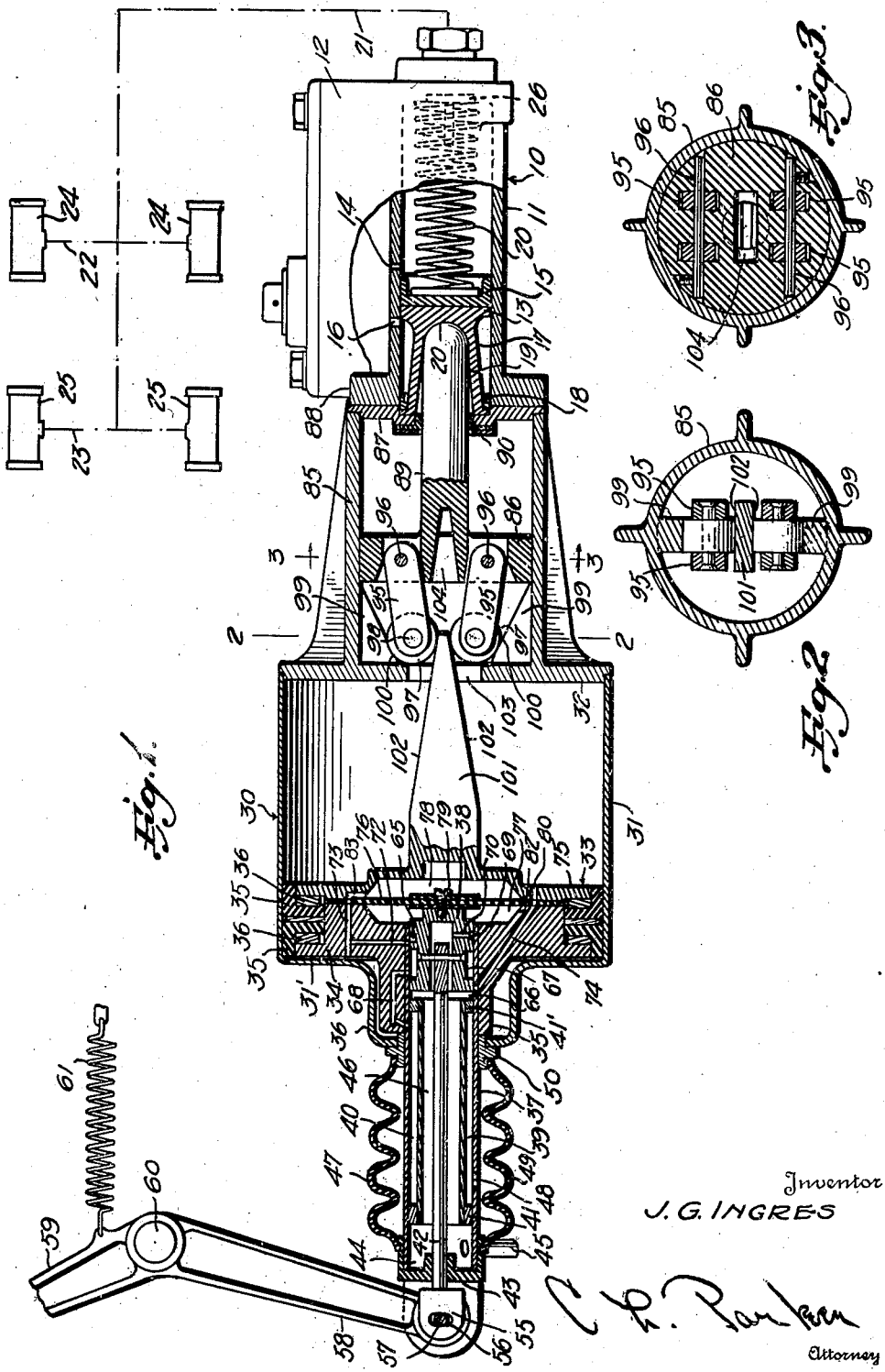
Inventor
J. G. INGRES Patented Feb. 19, 1946

2,395,223

UNITED STATES PATENT OFFICE 2,395,223

VEHICLE BRAKE MECHANISM

Jeannot G. Ingres, Detroit, Mich., assignor to Automatic Shifters, Inc., Richmond, Va., a corporation of Virginia Application January 13, 1944, Serial No. 518,114

4 Claims. (Cl. 60—54.6)

This invention relates to vehicle brake mechanisms.

A number of devices have been developed for the power actuation of hydraulic vehicle brakes to reduce force necessary to be exerted by the operator for a given degree of application of the vehicle brakes. Most devices of this character embody a power unit wholly separate from the conventional vehicle master cylinder and operated and controlled in accordance with the displacement of brake fluid from the master cylinder. Such a device ordinarily is connected to the master cylinder by a fluid line which makes it possible to locate the power unit at any desired spot in the vehicle chassis where there is sufficient space available for the power means, the fluid pressure motor usually employed in such a mechanism being of substantial diameter. In the interest of simplicity and compactness it also has been proposed to combine a power mechanism with the master cylinder, thus eliminating the use of a separate power unit and the means associated therewith for displacing fluid into the brake system to apply the brakes. Such devices are theoretically practicable, but in actual practice very few vehicles, and particularly passenger vehicles, provide the space necessary for the mounting of the fluid pressure motor. It is impracticable to reduce the size of the motor since such expedient results in substantially reducing the power beneath that which is necessary for the full application of the brakes.

An important object of the present invention is to provide a novel power operated brake mechanism wherein the power source and associated elements are formed as a single compact unit with the master cylinder and wherein a fluid pressure motor provides the brake-operating power, the novel construction of the mechanism being such that the motor may be made substantially smaller in diameter without any sacrifice in brake-applying power.

A further object is to provide an apparatus of this character wherein a given movement of the brake pedal results in a proportionately greater movement of the pressure responsive member of the power source and wherein a novel motion reduction mechanism translates such relatively greater motor operation back into a shorter operation of the fluid displacing piston, thereby providing a relatively greater degree of power by utilizing a greater movement of the movable unit of the motor while providing a fluid-displacing movement of the piston which corresponds relatively to the degree of movement of the brake pedal.

A further object is to provide such a mechanism wherein the motion reducing means is of such character as to permit the mounting of the power source and fluid-displacing piston in direct alinement with each other to preserve the greatest possible degree of compactness of the mechanism as a whole.

A further object is to provide an apparatus of the character referred to wherein a follow-up control mechanism is employed for the power source with one element of the control mechanism movable by the brake pedal to a substantially increased degree compared with conventional arrangements, whereby an extremely rapid response of the power source to movement of the brake pedal is obtained, thus eliminating any lagging of the brake application relative to pedal movement.

A further object is to provide an apparatus of the character just referred to wherein one element of the follow-up control mechanism is operable by the brake pedal and the other element by the pressure responsive unit of the motor which, as stated, moves to a relatively great extent compared with a given movement of the brake pedal, whereby the rapid response of the motor to movement of the brake pedal is obtained, and wherein a rapid cutting off of the power occurs through movement of the pressure movable unit of the motor to cause the follow-up action to take place very accurately and to eliminate any overrunning of the parts.

In the drawing I have shown one embodiment of the invention. In this showing—

Figure 1 is a sectional view taken axially through the apparatus, parts being broken away and parts being shown in elevation, the connection of the wheel brake cylinders to the mechanism being diagrammatically represented, Figure 2 is a detail sectional view on line 2—2 of Figure 1, and, Figure 3 is a similar view on line 3—3 of Figure 1.

Referring to Figure 1 the numeral 10 designates a substantially conventional master cylinder for the hydraulic brake system, the master cylinder comprising the usual cylinder 11, reservoir 12 and fluid displacing piston 13. The cylinder 11 is provided with a port 14 through which fluid may flow into the working end of the cylinder 11 to replenish any leakage which may occur therefrom. The piston 13 is provided with a conventional packing cup 15 and to assist in maintaining the packing cup in a soft condition, the cylinder 11 also may be provided with a port 16 through which brake fluid may flow into the cylinder 11 behind the piston 13.

The piston 13 may be substantially conventional, being cut-away intermediate its ends as at 17 and having an enlarged end opposite the packing cup 15 provided with suitable packing 18 to prevent leakage of fluid around the left hand end of the piston as viewed in Figure 1. The piston 17 is provided with an axial recess 19 having a hemispherical inner end 20 for a purpose to be described. The piston is provided with a return spring 20 to urge it to "off" position. The outlet end of the master cylinder is connected to a pipe line 21 having branches 22 and 23 to supply fluid to the forward and rear brake cylinders 24 and 25 respectively. The present device is shown in conjunction with a four-wheel brake system, but it will be apparent that the invention is practicable for use in other brake systems, such as those used with heavy vehicles having more than four wheels. The usual control valves generally indicated by the numeral 26 control the back and forth flow of fluid from the master cylinder 11 into the pipe line 21. Such valves are conventional and need not be described in detail.

The power source is indicated as a whole by the numeral 30 and is shown in the present instance as comprising a differential fluid pressure operated motor having a cylinder 31 provided with heads 31' and 32, the former of which, if desired, may be integral with the cylinder 31. A pressure responsive unit indicated as a whole by the numeral 33 is reciprocable in the cylinder 31. The unit 33 may comprise a body 34 which is preferably die cast and is provided with packing cups 35 having expansion rings 36 therewithin. The body 34 is provided with an axial extension 35 normally arranged in a similar extension 36 forming preferably an integral part of the cylinder head 31'.

The body 34 is provided with an axial sleeve 37 fixed therein and slidably receiving a valve 38. To the left of the valve 38 as viewed in Figure 1 the sleeve 37 carries an inner sleeve 39 of smaller diameter than the sleeve 37 to provide an air space 40 therebetween. This space is closed at its ends by heads 41 and 41' tightly fitting within the sleeve 37. The valve 38 is actuated by a rod 42 extending through a bearing 43 forming a closure for the outer end of the sleeve 37. The space between the bearing 43 and head 41 forms a vacuum space 44 with which a nipple 45 communicates, this nipple being adapted for connection by a suitable flexible hose with the intake manifold of the vehicle engine. The sleeve 39 is substantially larger than the rod 42 to form around the rod a vacuum space 46 which communicates with the vacuum space 44. Thus partial vacuum always exists in the space 46 and this space is connectible with the ends of the motor 30 by the valve 38, in a manner to be described.

The air space 40 also is adapted to be placed in communication with the respective ends of the motor 30 by operation of the valve 38, and the space 40 communicates with the interior of an expansible and contractible boot 47 through a port 48 formed in the sleeve 37. The interior of the boot communicates with the atmosphere through a port 49. One end of the boot 47 is connected to the bearing 43 and the other end is connected to a bearing 50 carried by the extension 36 and slidably receiving the sleeve 37.

The rod 42 carries a head 55 outwardly of the bearing 43 and this head is slotted as at 56 to receive a pin 57 carried by a crank arm 58 formed as the lower end of the brake pedal 59, this pedal being fulcrumed as at 60. The brake pedal is provided with the usual return spring 61.

The valve 38 is provided with spaced heads 65 and 66 defining an intermediate cut-away portion 67. The space around the cut-away portion 67 communicates through a passage 68 with the air space 40. This is true in any position of the valve 38. The spacing to the left of the head 66 of the valve is in fixed communication with the vacuum space 46 and this space also communicates through the interior of the valve 38 with an annular groove 69 through a passage 70.

The piston body 34 is provided with a passage 72 having its radially inner end in normal slight communication with the groove 69. The passage 72 communicates with a cross passage 73 one end of which communicates with the left hand end of the cylinder 31 as viewed in Figure 1. Another passage 74 is formed in the piston body 34 and has its radially inner end normally in restricted communication with the vacuum space to the left of the head 66. A cap 75 is arranged against one face of the piston body 34 and a diaphragm 76 is arranged between the cap 75 and the piston body. A recess 77 in the piston body cooperates with the diaphragm 76 to form a pressure chamber, and the cap 75 is similarly recessed as at 78 to cooperate with the diaphragm 76 to form a second pressure chamber. The diaphragm is secured to the valve 38 as at 79.

The cap 75 is provided with a passage 80 connecting the passage 74 to the right hand end of the cylinder 31 as viewed in Figure 1 and the passage 74 communicates with the chamber 77 through a groove 82 formed in the adjacent face of the piston body 34. The passage 73 communicates with the pressure chamber 78 through a small passage 83 formed in the diaphragm 76 and in the cap 75. It will be apparent that any pressures present in the left hand end of the cylinder 31 (Figure 1) will be duplicated in the chamber 78 through passages 73 and 83, and that any pressures in the right hand end of the cylinder 31 will be duplicated in the chamber 77 through passages 80, 74 and 82. This arrangement affords a resistance to manual movement of the valve to a degree proportional to energization of the motor 30, thus providing the pedal 59 with accurate feel, as will become more apparent below.

The cylinder head 32 carries a preferably integral cylinder 85 in which a head 86 is reciprocable. The cylinder 85 is provided at its right hand end (Figure 1) with a head 87 forming a closure for the cylinder and secured to a flange 88 formed integral with the master cylinder 11. An integral axial projection 89 is carried by the slidable head 86 and projects through the head 87 into the recess 19 to actuate the piston 13. The axial extension 89 has a hemispherical end fitting the hemispherical end 20 of the recess 19. The head 87 may be packed as at 90 to prevent the leakage past the extension 89 of any fluid which may seep past the packing 18.

Pairs of links 95 are carried by the slidable head 86 on opposite sides of the axis thereof and each pair of links is pivotally connected by a pin 96 to the head 86. The opposite end of each pair of links carries a roller 97 preferably formed of hardened steel, the adjacent ends of each pair of links carrying a pin 98 rotatably supporting the associated roller. A rib 99 is arranged in each side of the cylinder 85 and has an inclined surface 100 engageable by the adjacent roller 97.

An axial projection 101 is preferably formed integral with the cap 75 and has oppositely tapered faces 102. The projection 101 extends through an opening 103 formed in the head 32 and the tapered faces 102 respectively engage the rollers 97. The head 86 and projection 89 are recessed as at 104 to receive the wedge 101 during operation of the apparatus, as will become apparent.

The operation of the apparatus is as follows:

When it is desired to apply the brakes the operator will depress the foot pedal 59 and this action swings the lever arm 58 in a counter-clockwise direction to move the valve 65 toward the right as viewed in Figure 1. The space to the left of the valve head 66 and the groove 69 will have been in restricted communication with the respective passages 74 and 72 to exhaust air from both ends of the motor to "vacuum suspend" the piston 33. When the valve is moved to the right in the manner stated the groove 69 will move out of communication with the passage 72 and this passage will almost immediately communicate with the space around the valve cut-away 67, this space being in constant communication with the atmosphere through passage 68. Thus air will be admitted to the left hand end of the cylinder 31. At the same time movement of the valve 65 toward the right will cause the valve head 66 to open the passage 74 to full communication with the source of vacuum through the space 46.

Under the circumstances the piston 33 will start to move to the right and its extent of movement will depend upon the extent of movement imparted to the valve 38 by the brake pedal. The piston moves substantially with the valve 38, the latter partaking only of the slight lead with respect to the piston necessary to maintain air pressure to the left of the piston 33. As soon as movement of the brake pedal 59 is arrested, a very slight additional movement of the piston 33 will restore the normal relative position of the valve 38 with respect to the piston, thus cutting off the admission of air into the left hand end of the cylinder 31. Thus a perfect follow-up action of the piston with respect to the movement of the pedal 59 will be provided, the piston 33 automatically assuming the correct position relative to the valve 38 to maintain behind the piston 33 whatever air pressure is necessary to maintain the brakes in the desired applied position.

Actuation of the piston 33 in the manner stated moves the projection or wedge 101 between the rollers 97. The wedge 101 partakes of direct axial linear movement whereas the rollers 100 divide such linear movement into two components one of which is longitudinal and the other of which is radial as the rollers 97 move along the inclined surfaces 100. The horizontal movement imparted to the movable head 86 will depend upon the inclination of the surfaces 100. In the present instance the apparatus illustrated is of such design that the head 86 and the elements operated thereby will move a distance equal to approximately one-third the distance of movement of the piston 33 and wedge 101, the remaining movement of the wedge being compensated for by radially outward movement of the rollers 97. Movement of the head 86 is transmitted through the projection 89 to actuate the piston 13 and thus displace fluid from the master cylinder through the lines 21, 22 and 23 to the respective brake cylinders 24 and 25.

When the brakes are to be released, the operator will merely partially or wholly release the pedal 59, depending upon whether the brakes are to be partially or wholly released. The piston 33 obviously will follow-up with respect to the valve 38 by moving to the left in Figure 1 as the valve moves in the same direction incident to the releasing of the pedal 59. Thus a perfect follow-up action is provided and the follow-up valve action operates to very rapidly move the piston 33 to its "off" position when the brake pedal 59 is suddenly completely released. Such an operation will connect the space around the valve cut-away with the passage 74 while the vacuum groove 69 will be moved into full communication with the passage 72 to connect the left hand end of the cylinder 31 to the source of vacuum. Accordingly the piston 33 will be power operated to be moved to its "off" position.

The motion translating means comprising the rollers 97 and associated elements is important for several reasons. The movement of the piston 33 a greater distance than the master cylinder piston 13 permits the use of a motor 30 of reduced size. For example, with the arrangement shown the piston 33 moves approximately three times the distance of movement of the master cylinder piston 13. This design of the parts permits the use of a motor 30 the piston of which is of approximately one-third the area of that which would be required for generating the same pressure in the brake lines if the motor piston were directly connected to the master cylinder piston. Thus a unit of small diameter can be employed to permit the apparatus to be located directly beneath the floor boards of a motor vehicle. It is appreciated, of course, that some power loss will occur in the motion reducing mechanism, but this power loss is relatively negligible and accordingly is unimportant.

A second distinct advantage of the apparatus lies in the fact that the motor is more quickly and accurately responsive to a given movement of the brake pedal 59. As is well known, the crank arm 58 is conventionally very short and a given movement of the brake pedal results in relatively short movement of the control valve in conventional power operated brake mechanisms. This relatively short movement must be depended upon to take up any play which may be present between the brake pedal and the control valve and must energize the motor to a substantial extent to cause a rapid response of the motor to movement of the brake pedal. In the present construction a lever arm 58 of greater length is employed than in conventional constructions, and accordingly a given movement of the brake pedal will result in a relatively greater movement of the valve to instantly afford full communication of one end of the motor cylinder 31 with the source of partial vacuum. In the present instance, the ratio of movement between the wedge 101 and the piston 13 being 3:1, the lever arm 58 will be three times the normal length. This increased movement of the valve 65, particularly in view of the normal vacuum suspension of the piston 33, causes such an instantaneous response of the motor piston to movement of the brake pedal that no appreciable lag occurs. The use of the diaphragm 76 and associated elements is highly advisable inasmuch as this diaphragm is reversely subjected to pressures in the ends of the cylinder 31 to resist a brake-applying movement of the valve 38 away from its normal position to an extent exactly proportional to differential pressures in the motor 31, thus providing the pedal 59 with highly accurate feel. This device, per se, forms no part of the present invention.

The particular motion translating means illustrated in the drawing and comprising the rollers 97 and associated elements is important for the additional reason that it facilitates the arrangement of the motor 30 in direct axial alinement with the master cylinder piston 13, thus permitting the making of a highly compact mechanism. Moreover, the motion transmitting means illustrated and described exactly divides the forces transmitted to the rollers 97, thus keeping the transmitted forces in exact balance and reducing power losses, strains, etc., at a minimum.

The present construction is advantageous over prior constructions which employ a power unit operable by fluid displaced from the master cylinder in that it forms a single unit with the conventional master cylinder and eliminates one cylinder, its piston and packing means. The device therefore provides a simple compact unit particularly adapted for use in passenger cars, and the unit is capable of relatively inexpensive manufacture. Moreover, the elimination of the separate cylinder from which fluid is displaced into the brake cylinders eliminates much of the source of trouble occurring in an apparatus of this character, much of such trouble being due to failures in the piston packing.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A brake operating mechanism for a hydraulic brake system having a pedal, a hydraulic brake cylinder and a master cylinder having a piston therein and communicating with the brake cylinder, comprising a differential fluid pressure operated motor having a pressure movable member therein, a follow-up control valve mechanism for said motor comprising a pair of valve elements one movable with said pressure movable member, said pedal having a relatively long lever arm mechanically connected to the other of said valve elements, said pressure movable member and said piston being movable in axial alinement, a pair of links arranged on opposite sides of the axis of said piston and each having one end mechanically connected thereto, rollers carried by the other ends of said links, inclined elements diverging in the direction of fluid-displacing movement of said piston and against which said rollers are respectively arranged, and a wedge carried by said pressure movable member and having surfaces converging in said direction and extending between said rollers in contact therewith.

2. An operating mechanism for a hydraulic brake system comprising a master cylinder having a piston therein movable in one direction to displace fluid into the brake system, a guide structure fixed to the master cylinder in axial alinement therewith, a head operable in said guide structure and having a portion engaging said piston to transmit movement thereto, links connected to said head on opposite sides of the axis of said cylinders, rollers carried by said links, inclines diverging in said direction and engaged by said rollers, a differential fluid pressure motor in axial alinement with and carried by said guide structure, said motor having a pressure movable member therein provided with an axial projection extending in said direction and having faces converging in said direction and engaging said rollers therebetween, and a manually operable control valve mechanism for said motor.

3. An operating mechanism for a hydraulic brake system comprising a master cylinder having a piston therein movable in one direction to displace fluid into the brake system, a guide structure fixed to the master cylinder in axial alinement therewith, a head operable in said guide structure and having a portion engaging said piston to transmit movement thereto, links connected to said head on opposite sides of the axis of said cylinders, rollers carried by said links, inclines diverging in said direction and engaged by said rollers, a differential fluid pressure motor in axial alinement with and carried by said guide structure, said motor having a pressure movable member therein provided with an axial projection extending in said direction and having faces converging in said direction and engaging said rollers therebetween, a follow-up control valve mechanism for said motor comprising a pair of valve elements one of which is fixed to said pressure movable member, and a brake pedal having a relatively long lever arm connected to the other valve element.

4. A brake operating mechanism for a hydraulic brake system having a pedal, a hydraulic brake cylinder and a master cylinder having a piston therein and communicating with the brake cylinder, comprising a differential fluid pressure operated motor having a pressure movable member therein, a follow-up control valve mechanism for said motor comprising a pair of valve elements one movable with said pressure movable member, said pedal having a relatively long lever arm mechanically connected to the other of said valve elements, said pressure movable member and said piston being movable in axial alinement, a pair of rollers, opposed elements having inner faces diverging in the direction of fluid-displacing movement of said piston and against which said rollers are respectively arranged, a wedge carried by said pressure movable member and having surfaces converging in said direction and extending between said rollers in contact therewith to effect bodily movement thereof along said diverging faces, and means for transmitting bodily movement of said rollers to said piston.

JEANNOT G. INGRES.